United States Patent
Moscovich

[11] 4,116,536
[45] Sep. 26, 1978

[54] WIDE ANGLE LENS

[75] Inventor: Jacob Moscovich, Hollywood, Calif.

[73] Assignee: Vivitar Corporation, Santa Monica, Calif.

[21] Appl. No.: 728,649

[22] Filed: Oct. 1, 1976

[51] Int. Cl.$^2$ ............................................. G02B 11/34
[52] U.S. Cl. ................................................ 350/214
[58] Field of Search ...................................... 350/214

[56] References Cited

U.S. PATENT DOCUMENTS

| | | | |
|---|---|---|---|
| 3,748,021 | 7/1973 | Tajima et al. | 350/214 |
| 3,856,386 | 12/1974 | Fujioka | 350/214 |
| 3,966,306 | 6/1976 | Okudaira | 350/214 |

FOREIGN PATENT DOCUMENTS 1,396,907  3/1965  France ................................ 350/214

*Primary Examiner*—Conrad J. Clark
*Attorney, Agent, or Firm*—DeLio and Montgomery

[57] ABSTRACT

A wide angle lens system of the retrofocus type having a ratio of back focal length to equivalent focal length of greater than two and a large relative aperture. The lens system comprises 13 elements in nine groups including four consecutive doublets and is capable of focusing to an object distance of eleven equivalent focal lengths from the front vertex thereof.

18 Claims, 1 Drawing Figure

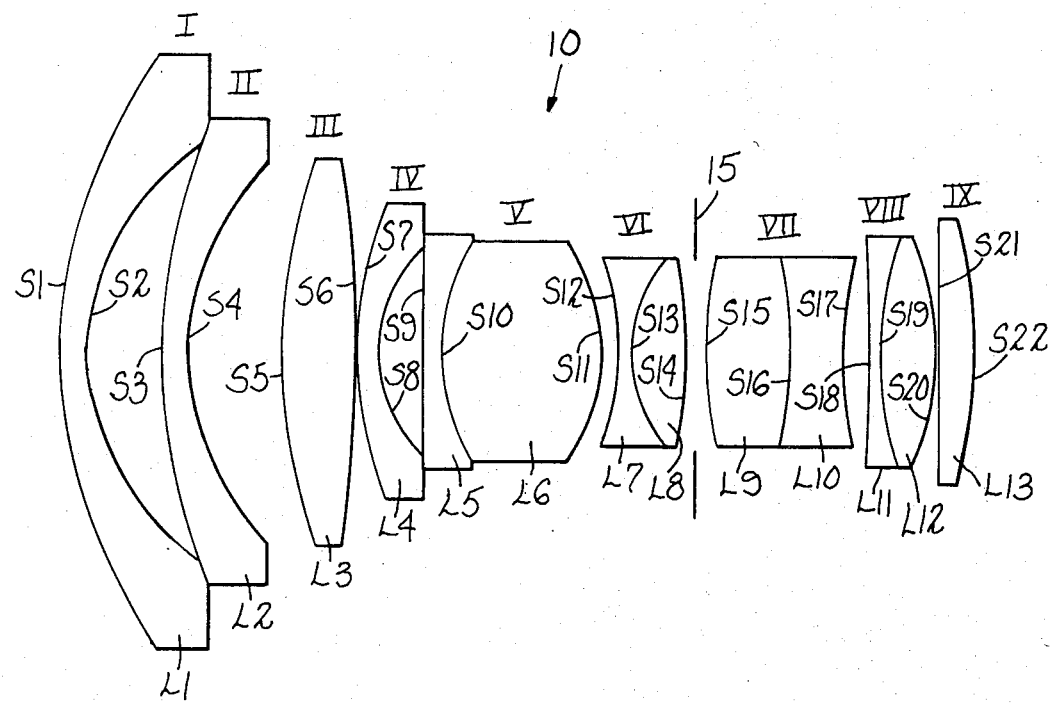

WIDE ANGLE LENS

This invention relates generally to the field of photographic lenses and more particularly to lenses of the retrofocus type.

Retrofocus lens systems may be defined as those in which the system's back focal length (BFL) is greater than its equivalent focal length (EFL). While moderately wide angle retrofocus lenses having field angles on the order of 80° or more have been known for many years, typically these lenses have been bulky, resulting in considerable manufacturing expense and a lack of easy portability. Furthermore, such lenses have heretofore been restricted to a small relative aperture which limits their usability to high natural light levels. To reduce the cost and size of the retrofocus lens, it is often necessary to increase the power of the individual lens elements, which also generally tends to increase the aberration of individual lenses, and hence the system as a whole, due to the increased surface areas and curvature of the lens elements.

Lenses of the retrofocus type generally have negative front groups of relatively short EFL's. These elements have large surface areas and short radii of curvature, which characteristically tends to contribute to a high distortion of the incoming rays considerably off the axis of the lens. The principal problems in the design of lenses of this type therefore involve the control of image-distorting chromatic aberrations, and particularly lateral color aberration. The large eccentricities of the off-axis ray bundles in the foremost element contributes to chromatic aberration in the lens system unless the primary axial chromatic aberration is kept small towards the front of the lens. Furthermore, the large constitution of aberration by the large lens elements is accompanied by significant higher order distortion components which makes an overall balance difficult to achieve.

The distortion of a lens system also increases with increasing BFL and relative aperture. When increasing BFL, the field angle, and the relative aperture of a lens system, it becomes increasingly difficult to correct for the aberrations which are thereby produced. Generally, since the BFL is approximately fixed (that is, for a single lens reflex camera having an image frame of 24 × 36mm, the BFL is generally on the order of 40 millimeters) there is usually a trade-off between the distortion and the relative aperture which generally requires a small aperture for a wide angle lens without unacceptable distortion.

When the relative aperture of the lens system is increased to as large as F/2.8, it is crucial to control aberration and particularly spherical aberration, while keeping the distortion as small as possible.

The present invention provides a retrofocus lens having a large relative aperture and a large ratio of BFL to EFL while maintaining a large field angle of substantially 100°. The herein-disclosed retrofocus lens system further provides a well-corrected lens capable of focusing to an object distance as close as 11 times the EFL as measured from the front vertex of the lens.

Briefly stated, the lens in a preferred form comprises 13 elements in nine groups, including four consecutive doublets. Two of the doublets are situated on each side of an aperture-determining mechanism. The lens moves as a whole for focusing, a portion of the lens moving differentially to compensate for aberration inherent in focusing on a nearby object.

A wide angle lens embodying the invention comprises a first lens group (the lens groups and elements are enumerated from the front object end to the rear image end) and a second lens group, both of which are divergent, a third convergent lens group, a fourth divergent lens group, a fifth doublet convergent group, a sixth doublet divergent group, a seventh doublet convergent group, an eighth doublet convergent group, and a ninth convergent lens group. The lens group and elements thereof and particularly the four consecutive doublets have relative power and configurations to achieve the objects of the invention as hereinafter pointed out.

It is an object of the present invention to provide a new and improved wide angle lens which subtends a field angle on the order of 100°.

It is another object of the invention to provide a new and improved retrofocus type lens which is well corrected for all forms of aberration and which has a ratio of back focal length to effective focal length greater than two.

A further object is to provide a lens of the type described which will focus closer than eleven EFL's without unacceptable distortion.

The features of the invention which are believed to be novel are particularly pointed out and distinctly claimed in the concluding portion of this specification. However, the invention both as to its organization and operation together with the further objects and advantages thereof, may best be appreciated by reference to the following detailed description taken in conjunction with the sole drawing which shows a side elevational view of a lens system embodying the invention.

In the design of any lens, the elements, groupings and spacings are chosen to minimize the aberration and distortion of the lens as a whole to provide a true image of an object. The lens groups are chosen to provide a lens of a given field angle or EFL for a specified image quality. Therefore, the contribution of each lens group or element or spacing therebetween in a multi-element lens to distortion or focal length is not always capable of precise delineation. All lens configurations represent a balance of factors and are selected in view of the others to provide the desired result.

With reference to the drawing, a lens 10 embodying the invention comprises nine lens groups numbered I-IX from the front object end to the rear image end and described generally as follows:

GROUP I comprises a meniscus L1 of negative power having a convex object side surface.

GROUP II comprises a second meniscus L2 of negative power, also having a convex object side surface.

GROUP III comprises a positive bi-convex element L3.

GROUP IV comprises a third meniscus L4 of negative power having a convex object side surface.

GROUP V comprises a first doublet of positive power comprising a negative meniscus L5 and a relatively thick element L6 towards the image side.

GROUP VI comprises a bi-concave - bi-convex doublet of negative power comprising lens elements L7, L8.

GROUP VII comprises a bi-convex - bi-concave doublet of positive power comprising lens elements L9 and L10.

GROUP VIII comprises a bi-concave - bi-convex doublet of positive power comprising lens elements L11 and L12.

GROUP IX comprises an element L13 of positive power. The aperture determining mechanism 15 is positioned between Groups VI and VII.

Since all of the embodiments disclosed herein have a similar basic configuration, they will all be described generally with reference to the sole FIGURE.

The EFL's of the lenses L1 and L2 comprising Groups I and II, respectively, are within five percent of each other, that is, $0.95 |F_{L1}| \leq |F_{L2}| \leq 1.05 |F_{L1}|$ The second negative meniscus lens, element L2, contributes to the correction of the unbalance of distortion which would generally be present if only one negative meniscus lens, L1, is provided.

Group III comprises a lens element L3 having a positive EFL and Group IV comprises a third meniscus lens L4 having a negative EFL. Lens elements L3 and L4 have EFL's which differ in sign and differ from each other in absolute value by less than 15%, $0.85 |F_{L3}| \leq |F_{L4}| \leq 1.15 |F_{L3}|$, which features contribute to the correction of chromatic aberration in the lens system. Lens elements L3 and L4 are very weak in power, which aids in maintaining the large ratio of BFL to EFL, and still permits color correction.

The next four groups, Group V–VIII, comprise four consecutive doublets, two on each side of the aperture-determining mechanism 15. The use of four consecutive doublets contributes significantly to correction of chromatic aberration.

Group V comprises a doublet having a negative object side element L5, and a relative thick image side element L6 having a positive EFL. The thickness of element L6 of Group V should be greater than seven-tenths the EFL of the element, or $D_{L6} > 0.7 F_{L6}$. This relationship provides a positive contribution to the Petzval sum and contributes significantly to the reduction of the Petzval curvature of lens system 10. The thickness of the element L6 also contributes to the correction of astigmatism in the lens.

The combined EFL of Group VI differs from three times the EFL of the lens system 10 by less than 5%, $2.95 |F_o| < |F_{VI}| < 3.05 |F_o|$. The lens elements L7 and L8 comprising Group VI are respectively comprised of glasses having substantially the same indices of refraction while having Abbe numbers that are substantially different.

Group VII, situated adjacent to aperture 15 on the image side thereof, comprises a positive object side element L9 and a negative image side element L10, both of which are of a substantial thickness.

Doublet Group VIII has a negative object side element L11 and a positive image side element L12. Group IX has a positive lens element L13. Groups VIII and IX together comprise a compensating group that compensates for aberrations during close focusing. Groups VIII and IX also provide a positive power for the correction of field curvature and contributes to maintaining a large BFL to EFL ratio. Lens Groups VIII and IX together have an EFL which differs in sign from front Groups I and II taken together and which differ therefrom in absolute value by less than 10%.

In the following tables, examples are set forth of lenses embodying the invention. Since for respective lens elements in the different examples the indices of refraction and the Abbe numbers are the same, they are presented only in Table I. $R_n$ designates the radius of curvature of the nth surface $S_n$, positive indicated radii being struck from the right and negative indicated radii being struck from the left as shown in the drawing.

Table I sets forth data on lens 10 scaled to an EFL as designated, for a 24 × 36 millimeter image frame and having a relative aperture of F/2.8.

TABLE I

| Lens | Radius | Axial Distance Between Surfaces | $N_d$ | $V_d$ |
|---|---|---|---|---|
| L1 | R1 = 38.166 mm | | | |
| | | 2.30 mm | 1.804 | 46.5 |
| | R2 = 20.917 | | | |
| | | 6.27 | | |
| | R3 = 44.249 | | | |
| L2 | | 2.20 | 1.804 | 46.5 |
| | R4 = 22.445 | | | |
| | R5 = 44.082 | | | |
| L3 | | 6.21 | 1.834 | 37.3 |
| | R6 = −92.683 | | | |
| | | 0.10 | | |
| | R7 = 29.496 | | | |
| L4 | | 1.50 | 1.620 | 60.3 |
| | R8 = 11.914 | | | |
| | | 3.51 | | |
| | R9 = 101.696 | | | |
| L5 | | 1.20 | 1.804 | 46.5 |
| | R10 = 15.113 | | | |
| L6 | | 13.20 | 1.487 | 70.4 |
| | R11 = −15.113 | | | |
| | | 1.51 | | |
| | R12 = −20.223 | | | |
| L7 | | 1.20 | 1.640 | 60.2 |
| | R13 = 11.526 | | | |
| L8 | | 4.40 | 1.620 | 36.3 |
| | R14 = −46.994 | | | |
| | | 1.50 | | |
| | R15 = 21.805 | | | |
| L9 | | 7.24 | 1.613 | 37.0 |
| | R16 = −49.501 | | | |
| L10 | | 4.77 | 1.805 | 25.5 |
| | R17 = 33,405 | | | |
| | R18 = −186.360 | | | |
| L11 | | 1.20 | 1.805 | 25.5 |
| | R19 = 23.403 | | | |
| L12 | | 5.06 | 1.569 | 63.1 |
| | R20 = −19.553 | | | |
| | | 0.10 | | |
| | R21 = 674.33 | | | |
| L13 | | 2.86 | 1.804 | 46.5 |
| | R22 = −42.191 | | | |

BFL = 39.6 mm
EFL = 17.34 mm
Aperture stop is 0.75mm behind lens L8

The spacing between elements L10 and L11 varies between 2 millimeters and 1.22 millimeters during focusing as the object distance from the front vertex varies from infinity to 186.4 millimeters. The lens 10 moves as a whole during focusing travel.

Table II sets forth data for a second embodiment of lens 10 having an EFL as set forth for a 24 × 36 millimeter image frame and having a relative aperture of F/2.8. The indices of refraction and the Abbe numbers for respective lens elements are the same as set forth in Table I above.

TABLE II

| Lens | Radius | Axial Distance Between Surfaces |
|---|---|---|
| L1 | R1 = 35.090 mm | |
| | | 2.50 mm |
| | R2 = 19.740 | |
| | | 6.21 |
| | R3 = 39.676 | |
| L2 | | 2.50 |
| | R4 = 21.457 | |
| | | 5.21 |
| | R5 = 41.114 | |
| L3 | | 5.53 |
| | R6 = −118.448 | |
| | | 0.10 |
| | R7 = 28.578 | |
| L4 | | 1.50 |
| | R8 = 11.690 | |
| | | 4.00 |

TABLE II-continued

| Lens | Radius | Axial Distance Between Surfaces |
|---|---|---|
| L5 | R9 = 161.824 | |
| | | 1.20 |
| | R10 = 16.025 | |
| L6 | | 12.61 |
| | R11 = −14.996 | |
| | | 1.39 |
| | R12 = −23.292 | |
| L7 | | 1.20 |
| | R13 = 11.348 | |
| L8 | | 4.27 |
| | R14 = −63.269 | |
| | | 2.64 |
| | R15 = 24.967 | |
| L9 | | 7.98 |
| | R16 = −54.338 | |
| L10 | | 6.80 |
| | R17 = 43.169 | |
| | | 1.07 |
| | R18 = −76.151 | |
| L11 | | 1.20 |
| | R19 = 27.065 | |
| L12 | | 4.90 |
| | R20 = −20.264 | |
| | | 0.10 |
| | R21 = 142.684 | |
| L13 | | 3.29 |
| | R22 = −40.880 | |

BFL = 39.62 mm
EFL = 17.34 mm
Aperture stop is 0.400 mm behind lens L8

The lens 10 moves as a whole for focusing. The spacing between lens elements L5 and L4 varies from 4 millimeters to 3.34 millimeters during focusing as the object distance from the front vertex is varied from infinity to 184.2 millimeters.

Table III sets forth data for a third embodiment of lens 10 having an EFL as noted below scaled to a 24 × 36 millimeter image frame and having a relative aperture of F/2.8. The indices of refraction and the Abbe numbers for respective lens elements are the same as set forth in Table I above.

TABLE III

| Lens | Radius | Axial Distance Between Surfaces |
|---|---|---|
| L1 | R1 = 35.647 mm | |
| | | 2.50 mm |
| | R2 = 20.288 | |
| | | 6.11 |
| L2 | R3 = 41.245 | |
| | | 2.50 |
| | R4 = 20.880 | |
| | | 5.94 |
| L3 | R5 = 39.486 | |
| | | 5.53 |
| | R6 = −105.466 | |
| | | 0.10 |
| L4 | R7 = 29.517 | |
| | | 1.50 |
| | R8 = 11.158 | |
| | | 3.63 |
| L5 | R9 = 97.566 | |
| | | 1.20 |
| | R10 = 19.393 | |
| L6 | | 12.61 |
| | R11 = −14.625 | |
| | | 1.02 |
| | R12 = −20.310 | |
| L7 | | 1.20 |
| | R13 = 13.872 | |
| L8 | | 4.27 |
| | R14 = −48.039 | |
| | | 2.73 |
| | R15 = 31.169 | |
| L9 | | 7.98 |
| | R16 = −52.351 | |
| L10 | | 6.80 |
| | R17 = 52.273 | |
| | | 1.10 |
| | R18 = −56.801 | |
| L11 | | 1.20 |
| | R19 = 32.257 | |
| L12 | | 4.90 |
| | R20 = −19.412 | |
| | | 0.10 |
| | R21 = 167.539 | |
| L13 | | 3.29 |
| | R22 = −39.382 | |

BFL = 39.62 mm
EFL = 17.34 mm
Aperture stop is 0.40 mm behind lens L8

The lens moves as a whole during focusing travel. The spacing between aperture stop and lens element L9 varies from 2.33 to 0.29 millimeters as the lens is focused on an object distance from the front vertex of from infinity to 187.3 millimeters.

Table IV sets forth data on a fourth embodiment of lens 10 scaled to an EFL as noted below for a 24 × 36 millimeter image frame and having a relative aperture of F/2.8. The indices of refraction and the Abbe numbers for respective lens elements are the same as set forth in Table I above.

TABLE IV

| Lens | Radius | Axial Distance Between Surfaces |
|---|---|---|
| L1 | R1 = 34.666 mm | |
| | | 2.50 mm |
| | R2 = 19.851 | |
| | | 6.18 |
| L2 | R3 = 40.109 | |
| | | 2.50 |
| | R4 = 21.320 | |
| | | 6.14 |
| L3 | R5 = 40.941 | |
| | | 5.53 |
| | R6 = −114.274 | |
| | | 0.10 |
| L4 | R7 = 28.479 | |
| | | 1.50 |
| | R8 = 11.576 | |
| | | 3.46 |
| L5 | R9 = 124.245 | |
| | | 1.20 |
| | R10 = 15.670 | |
| L6 | | 12.61 |
| | R11 = −14.946 | |
| | | 1.12 |
| | R12 = −23.332 | |
| L7 | | 1.20 |
| | R13 = 11.206 | |
| L8 | | 4.27 |
| | R14 = −74.899 | |
| | | 1.86 |
| | R15 = 24.760 | |
| L9 | | 7.978 |
| | R16 = −51.619 | |
| L10 | | 6.797 |
| | R17 = 45.297 | |
| | | 1.755 |
| | R18 = −69.165 | |
| L11 | | 1.20 |
| | R19 = 27.831 | |
| L12 | | 4.90 |
| | R20 = −19.614 | |
| | | 0.10 |
| | R21 = 125.497 | |
| L13 | | 3.29 |
| | R22 = −45.886 | |

BFL = 39.62 mm
EFL = 17.34 mm
Aperture stop is 0.400 mm behind lens L8

The spacing between elements L10 and L11 varies from 1.755 millimeters to 0.955 millimeters for focusing on an object distance from the front vertex of from infinity to 183.1 millimeters. The elements L11–L13 move as a group during focusing travel.

Table V sets forth data on a fifth embodiment of lens 10 scaled to an EFL as noted below for a 24 × 36 millimeter image frame and having a relative aperture of F/2.8. The indices of refraction and the Abbe numbers for respective lens elements are the same as set forth in Table I above.

TABLE V

| Lens | | Radius | Axial Distance Between Surfaces |
|---|---|---|---|
| L1 | R1 = | 37.687 mm | |
| | | | 2.50 mm |
| | R2 = | 20.590 | |
| | | | 6.32 |
| L2 | R3 = | 44.147 | |
| | | | 2.50 |
| | R4 = | 22.138 | |
| | | | 7.47 |
| L3 | R5 = | 41.270 | |
| | | | 5.10 |
| | R6 = | −99.692 | |
| | | | 0.10 |
| L4 | R7 = | 29.488 | |
| | | | 1.50 |
| | R8 = | 11.914 | |
| | | | 3.59 |
| L5 | R9 = | 121.772 | |
| | | | 1.20 |
| | R10 = | 15.490 | |
| L6 | | | 13.27 |
| | R11 = | −15.184 | |
| | | | 1.65 |
| L7 | R12 = | −20.452 | |
| | | | 1.20 |
| | R13 = | 11.716 | |
| L8 | | | 4.10 |
| | R14 = | −50.477 | |
| | | | 1.50 |
| L9 | R15 = | 22.659 | |
| | | | 7.38 |
| | R16 = | −43.247 | |
| L10 | | | 6.13 |
| | R17 = | 36.689 | |
| | | | 1.57 |
| L11 | R18 = | −212.451 | |
| | | | 1.20 |
| | R19 = | 23.915 | |
| L12 | | | 4.86 |
| | R20 = | −20.039 | |
| | | | 0.10 |
| | R21 = | 422.791 | |
| L13 | | | 2.95 |
| | R22 = | −41.575 | |

BFL = 39.62 mm
EFL = 17.34 mm
Aperture stop is 0.750 mm behind lens L8

The spacing between elements L10 and L11 varies from 1.57 millimeters to 0.79 millimeters for focusing on an object distance from the front vertex of from infinity to 183.7 millimeters. Elements L11–L13 move as a group during focusing travel.

Table VI sets forth data on a sixth embodiment of lens 10 scaled to an EFL as noted below for a 24 × 36 millimeter image frame and having a relative aperture of F/2.8. The indices of refraction and the Abbe numbers for respective lens elements are the same as set forth in Table I above.

TABLE VI

| Lens | | Radius | Axial Distance Between Surfaces |
|---|---|---|---|
| L1 | R1 = | 37.743 mm | |
| | | | 2.50 mm |
| | R2 = | 20.766 | |
| | | | 6.00 |
| L2 | R3 = | 41.809 | |
| | | | 2.50 |
| | R4 = | 21.723 | |
| | | | 7.79 |
| L3 | R5 = | 41.399 | |
| | | | 5.04 |
| | R6 = | −101.957 | |
| | | | 0.10 |
| L4 | R7 = | 29.194 | |
| | | | 1.50 |
| | R8 = | 11.671 | |
| | | | 3.58 |
| L5 | R9 = | 118.52 | |
| | | | 1.20 |
| | R10 = | 15.540 | |
| L6 | | | 12.80 |
| | R11 = | −15.075 | |
| | | | 1.37 |
| L7 | R12 = | −20.838 | |
| | | | 1.20 |
| | R13 = | 11.454 | |
| L8 | | | 5.18 |
| | R14 = | −55.089 | |
| | | | 0.80 |
| L9 | R15 = | 22.705 | |
| | | | 7.17 |
| | R16 = | −43.192 | |
| L10 | | | 6.82 |
| | R17 = | 37.393 | |
| | | | 1.57 |
| L11 | R18 = | −194.603 | |
| | | | 1.20 |
| | R19 = | 24.209 | |
| L12 | | | 4.84 |
| | R20 = | −19.91 | |
| | | | 0.10 |
| | R21 = | 371.888 | |
| L13 | | | 2.95 |
| | R22 = | −41.912 | |

BFL = 39.62 mm
EFL = 17.34 mm
Aperture stop is 0.400 mm behind lens L8

The spacing between elements L10 and L11 varies from 1.57 millimeters to 0.78 millimeters for focusing on an object distance from the front vertex of from infinity to 183.8 millimeters. All elements L11–L13 move in a group during focusing travel.

Table VII sets forth the EFL's of each of the elements of each of the lenses in Tables I–VI and the EFL's of selected groupings of the elements thereof.

TABLE VII

| | EFL of Lens Elements and Selected Combinations (in mm) | | | | | |
|---|---|---|---|---|---|---|
| Element | I | II | III | IV | V | VI |
| L1 | −60.886 | −60.208 | −62.820 | −62.154 | −60.076 | −61.140 |
| L2 | −59.013 | −61.588 | −55.356 | −59.864 | −57.873 | −59.234 |
| L3 | 36.346 | 36.948 | 34.837 | 36.506 | 35.360 | 35.652 |
| L4 | −33.176 | −32.881 | −29.733 | −32.417 | −33.1839 | −32.276 |
| L5 | −22.097 | −22.086 | −30.150 | −22.294 | −22.069 | −22.242 |
| L6 | 18.036 | 18.279 | 19.409 | 18.087 | 18.272 | 18.134 |
| L7 | −11.256 | −11.716 | −12.654 | −11.624 | −11.426 | −11.338 |
| L8 | 15.266 | 15.764 | 17.716 | 15.922 | 15.632 | 15.662 |
| L9 | 25.528 | 28.839 | 32.870 | 28.253 | 25.180 | 25.171 |
| L10 | −23.926 | −28.706 | −31.276 | −28.783 | −23.613 | −23.761 |
| L11 | −25.520 | −24.444 | −25.165 | −24.286 | −26.391 | −26.430 |
| L12 | 19.495 | 21.092 | 21.986 | 20.940 | 19.898 | 19.333 |
| L13 | 49.210 | 39.628 | 39.730 | 39.891 | 46.962 | 46.748 |
| Group | | | | | | |
| V | 43.703 | 45.956 | 36.406 | 44.190 | 45.083 | 44.498 |
| VI | −53.707 | −54.281 | −53.829 | −49.806 | −51.684 | −50.702 |
| VII | 193.050 | 153.039 | 298.942 | 136.913 | 178.349 | 167.697 |
| VIII | 62.719 | 95.854 | 101.811 | 93.546 | 63.170 | 63.243 |
| I, II | −28.266 | −28.679 | −30.146 | −28.770 | −27.724 | −28.380 |
| VIII-IX | 27.195 | 27.033 | 27.355 | 26.908 | 26.623 | 25.549 |

The embodiments disclosed in Tables I–VI may be focused on an object closer than 11 EFL's from the front element, or about a 0.3 meter object to image distance. Table VIII sets forth the close focusing capabilities of the various embodiments, wherein FD designates the close focusing distance from the front vertex of lens 10 for an object distance without unacceptable distortion.

TABLE VIII

| Lens | Close Focus Distances | | FD/EFL |
|---|---|---|---|
| | Close Focus Distance (FD) | | |
| Table I | 186.4 mm | 7.34 in | 10.75 |
| II | 184.2 mm | 7.25 | 10.62 |
| III | 187.3 | 7.37 | 10.80 |
| IV | 183.1 | 7.21 | 10.55 |
| V | 183.7 | 7.23 | 10.59 |
| VI | 183.8 | 7.23 | 10.60 |

It may thus be seen that the objects of the invention set forth above as well as those made apparent have been efficiently attained. The invention provides a new and improved wide angle lens of the retrofocus type having a large relative aperture and the capability of extremely close focusing without unacceptable distortion.

While preferred embodiments of the invention have been set forth for purposes of disclosure, other embodiments and modifications of the disclosed embodiment of the invention may be derived by others skilled in the art. Accordingly, the appended claims are intended to cover all embodiments and applications of the invention and reversals thereof which do not depart from the spirit and scope of the invention.

What is claimed is:

1. A wide angle lens of the retrofocus type comprising from the object end to the image end a first negative group, a second negative group, a third positive group, a fourth negative group, a fifth positive group, a sixth negative group, a seventh positive group, an eighth positive group and a ninth positive group, said eighth and ninth groups having a combined equivalent focal length opposite in sign to and having an absolute value within 10 percent of the combined equivalent focal lengths of said first and second groups.

2. A wide angle lens as defined in claim 1 wherein each of said fifth group, said sixth group, said seventh group and said eighth group comprises a doublet.

3. A wide angle lens as defined in claim 2 wherein said fifth group has a lens element on the image side thereof having a thickness greater than seven-tenths the equivalent focal length of said element.

4. A wide angle lens as defined in claim 2 wherein the lens elements comprising the doublet of said sixth lens group have indices of refraction that are substantially the same, and Abbe numbers having a large difference.

5. A wide angle lens as defined in claim 1 further comprising an aperture-determining means situated between said sixth group and said seventh group.

6. A wide angle lens as defined in claim 1 wherein the first group and the second group have equivalent focal lengths having the relationship $0.95 |F_{L1}| \leq |F_{L2}| \leq 1.05 |F_{L1}|$, wherein $|F_{L1}|$ is the absolute value of the equivalent focal length of the first group and $|F_{L2}|$ is the absolute value of the equivalent focal length of the second group.

7. A wide angle lens as defined in claim 1 wherein the third group and the fourth group have equivalent focal lengths that differ in sign and have the relationship $0.85 |F_{L3}| \leq |F_{L4}| \leq 1.15 |F_{L3}|$, wherein $|F_{L3}|$ is the absolute value of the equivalent focal length of the third group and $|F_{L4}|$ is the absolute value of the equivalent focal length of the fourth group.

8. A wide angle lens as defined in claim 1 wherein the eighth and ninth groups have a combined equivalent focal length of between 1.4 and 1.7 times the equivalent focal length of said lens.

9. A wide angle lens as defined in claim 1 wherein said lens has a field angle of substantially 100°, a relative aperture of F/2.8 and a ratio of back focal length to equivalent focal length of greater than two.

10. A wide angle lens as defined in claim 1 wherein said lens moves as a whole during focusing travel, said lens further having an axial spacing between groups seven and eight, said spacing varying during focusing travel to permit close focusing.

11. A wide angle lens as defined in claim 10 defined substantially by the following data as scaled to an equivalent focal length of substantially 17mm for a 24 × 36mm image frame:

| Lens | Radius | Axial Distance Between Surfaces | $N_d$ | $V_d$ |
|---|---|---|---|---|
| L1 | R1 = 38.166 mm | | | |
| | | 2.30 mm | 1.804 | 46.5 |
| | R2 = 20.917 | | | |
| | | 6.27 | | |
| L2 | R3 = 44.249 | | | |
| | | 2.20 | 1.804 | 46.5 |
| | R4 = 22.445 | | | |
| | | 7.87 | | |
| L3 | R5 = 44.082 | | | |
| | | 6.21 | 1.834 | 37.3 |
| | R6 = −92.683 | | | |
| | | 0.10 | | |
| L4 | R7 = 29.496 | | | |
| | | 1.50 | 1.620 | 60.3 |
| | R8 = 11.914 | | | |
| | | 3.51 | | |
| L5 | R9 = 101.696 | | | |
| | | 1.20 | 1.804 | 46.5 |
| | R10 = 15.113 | | | |
| L6 | | 13.20 | 1.487 | 70.4 |
| | R11 = −15.113 | | | |
| | | 1.51 | | |
| | R12 = −20.223 | | | |
| L7 | | 1.20 | 1.640 | 60.2 |
| | R13 = 11.526 | | | |
| L8 | | 4.40 | 1.620 | 36.3 |
| | R14 = −46.994 | | | |
| | | 1.50 | | |
| | R15 = 21.805 | | | |
| L9 | | 7.24 | 1.613 | 37.0 |
| | R16 = −49.501 | | | |
| L10 | | 4.77 | 1.805 | 25.5 |
| | R17 = 33,405 | | | |
| | R18 = 186.360 | | | |
| L11 | | 2.00 | | |
| | | 1.20 | 1.805 | 25.5 |
| | R19 = 23.403 | | | |
| L12 | | 5.06 | 1.569 | 63.1 |
| | R20 = −19.553 | | | |
| | | 0.10 | | |
| | R21 = 674.33 | | | |
| L13 | | 2.86 | 1.804 | 46.5 |
| | R22 = −42.191 | | | |

BFL = 39.6 mm

Where L1–L13 are successive lens elements arranged in nine groups as follows: L1; L2; L3; L4; L5, L6; L7, L8; L9, L10; L11, L12; L13; R1–R22 are the radii of curvature of the successive lens surfaces according to the sequence of surfaces in the lens system, and $N_d$ and $V_d$ are the indices of refraction and Abbe numbers, respectively, of the individual lens elements, said lens further having an aperture stop situated between said elements L8 and L9.

12. A wide angle lens as defined in claim 10 defined substantially by the following data as scaled to an equivalent focal length of substantially 17mm for a 24 × 36mm image frame.

| Lens | Radius | | Axial Distance Between Surfaces | $N_d$ | $V_d$ |
|---|---|---|---|---|---|
| L1 | R1 = | 34.666 mm | | | |
| | | | 2.50 mm | 1.804 | 46.5 |
| | R2 = | 19.851 | | | |
| | | | 6.18 | | |
| L2 | R3 = | 40.109 | | | |
| | | | 2.50 | 1.804 | 46.5 |
| | R4 = | 21.320 | | | |
| | | | 6.14 | | |
| L3 | R5 = | 40.941 | | | |
| | | | 5.53 | 1.834 | 37.3 |
| | R6 = | −114.274 | | | |
| | | | 0.10 | | |
| L4 | R7 = | 28.479 | | | |
| | | | 1.50 | 1.620 | 60.3 |
| | R8 = | 11.576 | | | |
| | | | 3.46 | | |
| L5 | R9 = | 124.245 | | | |
| | | | 1.20 | 1.804 | 46.5 |
| | R10 = | 15.670 | | | |
| L6 | | | 12.61 | 1.487 | 70.4 |
| | R11 = | −14.946 | | | |
| | | | 1.12 | | |
| L7 | R12 = | −23.332 | | | |
| | | | 1.20 | 1.640 | 60.2 |
| | R13 = | 11.206 | | | |
| L8 | | | 4.27 | 1.620 | 36.3 |
| | R14 = | −74.899 | | | |
| | | | 1.86 | | |
| L9 | R15 = | 24.760 | | | |
| | | | 7.978 | 1.613 | 37.0 |
| | R16 = | −51.619 | | | |
| L10 | | | 6.797 | 1.805 | 25.5 |
| | R17 = | 45.297 | | | |
| | | | 1.755 | | |
| L11 | R18 = | −69.165 | | | |
| | | | 1.20 | 1.805 | 25.5 |
| | R19 = | 27.831 | | | |
| L12 | | | 4.90 | 1.569 | 63.1 |
| | R20 = | −19.614 | | | |
| | | | 0.10 | | |
| L13 | R21 = | 125.497 | | | |
| | | | 3.29 | 1.804 | 46.5 |
| | R22 = | −45.886 | | | |

BFL = 39.62 mm

Where L1-L13 are successive lens elements arranged in nine groups as follows: L1; L2; L3; L4; L5, L6; L7, L8; L9, L10; L11, L12; L13; R1-R22 are the radii of curvature of the successive lens surfaces and according to the sequence of surfaces in the lens system, and $N_d$ and $V_d$ are the indices of refraction and Abbe numbers, respectively, of the individual lens elements, said lens further having an aperture stop between said elements L8 and L9.

13. A wide angle lens as defined in claim 10 defined substantially by the following data as scaled to an equivalent focal length of substantially 17mm for a 24 × 36mm image frame:

| Lens | Radius | | Axial Distance Between Surfaces | $N_d$ | $V_d$ |
|---|---|---|---|---|---|
| L1 | R1 = | 37.687 mm | | | |
| | | | 2.50 mm | 1.804 | 46.5 |
| | R2 = | 20.590 | | | |
| | | | 6.32 | | |
| L2 | R3 = | 44.147 | | | |
| | | | 2.50 | 1.804 | 46.5 |
| | R4 = | 22.138 | | | |
| | | | 7.47 | | |
| L3 | R5 = | 41.270 | | | |
| | | | 5.10 | 1.834 | 37.3 |
| | R6 = | −99.692 | | | |
| | | | 0.10 | | |
| L4 | R7 = | 29.488 | | | |
| | | | 1.50 | 1.620 | 60.3 |
| | R8 = | 11.914 | | | |
| | | | 3.59 | | |
| L5 | R9 = | 121.772 | | | |
| | | | 1.20 | 1.804 | 46.5 |
| | R10 = | 15.490 | | | |
| L6 | | | 13.27 | 1.487 | 70.4 |
| | R11 = | −15.184 | | | |
| | | | 1.65 | | |
| L7 | R12 = | −20.452 | | | |
| | | | 1.20 | 1.640 | 60.2 |
| | R13 = | 11.716 | | | |
| L8 | | | 4.1 | 1.620 | 36.3 |
| | R14 = | −50.477 | | | |
| | | | 1.50 | | |
| L9 | R15 = | 22.659 | | | |
| | | | 7.38 | 1.613 | 37.0 |
| | R16 = | −43.247 | | | |
| L10 | | | 6.13 | 1.805 | 25.5 |
| | R17 = | 36.689 | | | |
| | | | 1.57 | | |
| L11 | R18 = | −212.451 | | | |
| | | | 1.20 | 1.805 | 25.5 |
| | R19 = | 23.915 | | | |
| L12 | | | 4.86 | 1.569 | 63.1 |
| | R20 = | −20.039 | | | |
| | | | 0.10 | | |
| L13 | R21 = | 422.791 | | | |
| | | | 2.95 | 1.804 | 46.5 |
| | R22 = | −41.575 | | | |

BFL = 39.62 mm

Where L1-L13 are successive lens elements arranged in nine groups as follows: L1; L2; L3; L4; L5, L6; L7, L8; L9, L10; L11, L12; L13; R1-R22 are the radii of curvature of the successive lens surfaces according to the sequence of surfaces in the lens system, and $N_d$ and $V_d$ are the indices of refraction and Abbe numbers, respectively, of the individual lens elements, said lens further comprising an aperture stop situated between elements L8 and L9.

14. A wide angle lens as defined in claim 10 defined substantially by the following data as scaled to an equivalent focal length of substantially 17mm for a 24 × 36mm image frame:

| Lens | Radius | | Axial Distance Between Surfaces | $N_d$ | $V_d$ |
|---|---|---|---|---|---|
| L1 | R1 = | 37.743 mm | | | |
| | | | 2.50 mm | 1.804 | 46.5 |
| | R2 = | 20.766 | | | |
| | | | 6.00 | | |
| L2 | R3 = | 41.809 | | | |
| | | | 2.50 | 1.804 | 46.5 |
| | R4 = | 21.723 | | | |
| | | | 7.79 | | |
| L3 | R5 = | 41.399 | | | |
| | | | 5.04 | 1.834 | 37.3 |
| | R6 = | −101.957 | | | |
| | | | 0.10 | | |
| L4 | R7 = | 29.194 | | | |
| | | | 1.50 | 1.620 | 60.3 |
| | R8 = | 11.671 | | | |
| | | | 3.58 | | |
| L5 | R9 = | 118.52 | | | |
| | | | 1.20 | 1.804 | 46.5 |
| | R10 = | 15.540 | | | |
| L6 | | | 12.80 | 1.487 | 70.4 |
| | R11 = | −15.075 | | | |
| | | | 1.37 | | |
| L7 | R12 = | −20.838 | | | |
| | | | 1.20 | 1.640 | 60.2 |
| | R13 = | 11.454 | | | |
| L8 | | | 5.18 | 1.620 | 36.3 |
| | R14 = | −55.089 | | | |
| | | | 0.80 | | |
| L9 | R15 = | 22.705 | | | |
| | | | 7.17 | 1.613 | 37.0 |
| | R16 = | −43.192 | | | |
| L10 | | | 6.82 | 1.805 | 25.5 |
| | R17 = | 37.393 | | | |
| | | | 1.57 | | |
| L11 | R18 = | −194.603 | | | |
| | | | 1.20 | 1.805 | 25.5 |
| | R19 = | 24.209 | | | |
| L12 | | | 4.84 | 1.569 | 63.1 |
| | R20 = | −19.91 | | | |
| | | | 0.10 | | |
| | R21 = | 371.888 | | | |

-continued

| Lens | Radius | Axial Distance Between Surfaces | $N_d$ | $V_d$ |
|---|---|---|---|---|
| L13 | | 2.95 | 1.804 | 46.5 |
| | R22 = −41.912 | | | |

BFL = 39.62 mm

Where L1–L13 are successive lens elements arranged in nine groups as follows: L1; L2; L3; L4; L5, L6; L7, L8; L9, L10; L11, L12; L13; R1–R22 are the radii of curvature of the successive lens surfaces according to the sequence of surfaces in the lens system, and $N_d$ and $V_d$ are the indices of refraction and Abbe numbers, respectively, of the individual lens elements, said lens further comprising an aperture stop situated between said elements L8 and L9.

15. A wide angle lens as defined in claim 1 wherein said lens moves as a whole during focusing travel, said lens further having an axial spacing between groups four and five, said spacing varying during focusing travel to permit close focusing.

16. A wide angle lens as defined in claim 15 defined substantially by the following data as scaled to an equivalent focal length of substantially 17mm for a 24 × 36mm image frame:

| Lens | Radius | Axial Distance Between Surfaces | $N_d$ | $V_d$ |
|---|---|---|---|---|
| L1 | R1 = 35.090 mm | | | |
| | | 2.50 mm | 1.804 | 46.5 |
| | R2 = 19.740 | | | |
| | | 6.21 | | |
| L2 | R3 = 39.676 | | | |
| | | 2.50 | 1.804 | 46.5 |
| | R4 = 21.457 | | | |
| | | 5.21 | | |
| L3 | R5 = 41.114 | | | |
| | | 5.53 | 1.834 | 37.3 |
| | R6 = −118.448 | | | |
| | | 0.10 | | |
| L4 | R7 = 28.578 | | | |
| | | 1.50 | 1.620 | 60.3 |
| | R8 = 11.690 | | | |
| | | 4.00 | | |
| L5 | R9 = 161.824 | | | |
| | | 1.20 | 1.804 | 46.5 |
| | R10 = 16.025 | | | |
| L6 | | 12.61 | 1.487 | 70.4 |
| | R11 = −14.996 | | | |
| | | 1.39 | | |
| L7 | R12 = −23.292 | | | |
| | | 1.20 | 1.640 | 60.2 |
| L8 | R13 = 11.348 | | | |
| | | 4.27 | 1.620 | 36.3 |
| | R14 = −63.269 | | | |
| | | 2.64 | | |
| L9 | R15 = 24.967 | | | |
| | | 7.98 | 1.613 | 37.0 |
| L10 | R16 = −54.338 | | | |
| | | 6.80 | 1.805 | 25.5 |
| | R17 = 43.169 | | | |
| | | 1.07 | | |
| L11 | R18 = −76.151 | | | |
| | | 1.20 | 1.805 | 25.5 |
| L12 | R19 = 27.065 | | | |
| | | 4.90 | 1.569 | 63.1 |
| | R20 = −20.264 | | | |
| | | 0.10 | | |
| L13 | R21 = 142.684 | | | |
| | | 3.29 | 1.804 | 46.5 |
| | R22 = −40.880 | | | |

BFL = 39.62 mm

Where L1–L13 are successive lens elements arranged in nine groups as follows: L1; L2; L3; L4; L5, L6; L7, L8; L9, L10; L11, L12; L13; R1–R22 are the radii of curvature of the successive lens surfaces according to the sequence of surfaces in the lens system, and $N_d$ and $V_d$ are the indices of refraction and Abbe numbers, respectively, of the individual lens elements, said lens further having an aperture stop situated between said elements L8 and L9.

17. A wide angle lens as defined in claim 1 wherein said lens moves as a whole during focusing travel, said lens further having an axial spacing between groups six and seven, said spacing varying during focusing travel to permit close focusing.

18. A wide angle lens as defined in claim 17 defined substantially by the following data as scaled to an equivalent focal length of substantially 17mm for a 24 × 36mm image frame:

| Lens | Radius | Axial Distance Between Surfaces | $N_d$ | $V_d$ |
|---|---|---|---|---|
| L1 | R1 = 35.647 mm | | | |
| | | 2.50 mm | 1.804 | 46.5 |
| | R2 = 20.288 | | | |
| | | 6.11 | | |
| L2 | R3 = 41.245 | | | |
| | | 2.50 | 1.804 | 46.5 |
| | R4 = 20.880 | | | |
| | | 5.94 | | |
| L3 | R5 = 39.486 | | | |
| | | 5.53 | 1.834 | 37.3 |
| | R6 = −105.466 | | | |
| | | 0.10 | | |
| L4 | R7 = 29.517 | | | |
| | | 1.50 | 1.620 | 60.3 |
| | R8 = 11.158 | | | |
| | | 3.63 | | |
| L5 | R9 = 97.566 | | | |
| | | 1.20 | 1.804 | 46.5 |
| | R10 = 19.393 | | | |
| L6 | | 12.61 | 1.487 | 70.4 |
| | R11 = −14.625 | | | |
| | | 1.02 | | |
| L7 | R12 = −20.310 | | | |
| | | 1.20 | 1.640 | 60.2 |
| L8 | R13 = 13.872 | | | |
| | | 4.27 | 1.620 | 36.3 |
| | R14 = −48.039 | | | |
| | | 2.73 | | |
| L9 | R15 = 31.169 | | | |
| | | 7.98 | 1.613 | 37.0 |
| L10 | R16 = −52.351 | | | |
| | | 6.80 | 1.805 | 25.5 |
| | R17 = 52.273 | | | |
| | | 1.10 | | |
| L11 | R18 = −56.801 | | | |
| | | 1.20 | 1.805 | 25.5 |
| L12 | R19 = 32.257 | | | |
| | | 4.90 | 1.569 | 63.1 |
| | R20 = −19.412 | | | |
| | | 0.10 | | |
| L13 | R21 = 167.539 | | | |
| | | 3.29 | 1.804 | 46.5 |
| | R22 = −39.382 | | | |

BFL = 39.62 mm

Where L1–L13 are successive lens elements arranged in nine groups as follows: L1; L2; L3; L4; L5, L6; L7, L8; L9, L10; L11, L12; L13; R1–R22 are the radii of curvature of the successive lens surfaces according to the sequence of surfaces in the lens system, and $N_d$ and $V_d$ are the indices of refraction and Abbe numbers, respectively, of the individual lens elements, said lens further having an aperture stop situated between said elements L8 and L9.

* * * * *

UNITED STATES PATENT AND TRADEMARK OFFICE
CERTIFICATE OF CORRECTION

PATENT NO. : 4,116,536
DATED : September 26, 1978
INVENTOR(S) : Jacob Moscovich

It is certified that error appears in the above-identified patent and that said Letters Patent are hereby corrected as shown below:

Column 10, claim 11, in the Table, "R18 = 186.360" should read --R18 = -186.360--.

Signed and Sealed this

Twelfth Day of December 1978

[SEAL]

Attest:

RUTH C. MASON
Attesting Officer

DONALD W. BANNER
Commissioner of Patents and Trademarks